(12) United States Patent
Wenninger et al.

(10) Patent No.: US 9,648,017 B2
(45) Date of Patent: May 9, 2017

(54) METHOD FOR CONTROLLING A DEVICE REQUIRING USER-RELATED PERMISSIONS VIA A MOBILE TERMINAL

(71) Applicant: SKIDATA AG, Groedig/Salzburg (AT)

(72) Inventors: Christian Wenninger, Groedig/Salzburg (AT); Bernd Duchac, Groedig/Salzburg (AT)

(73) Assignee: SKIDATA AG, Groedig/Salzburg (AT)

( * ) Notice: Subject to any disclaimer, the term of this patent is extended or adjusted under 35 U.S.C. 154(b) by 29 days.

(21) Appl. No.: 14/699,127

(22) Filed: Apr. 29, 2015

(65) Prior Publication Data

US 2016/0028727 A1 Jan. 28, 2016

(30) Foreign Application Priority Data

Jul. 25, 2014 (EP) ..................................... 14178592

(51) Int. Cl.
*H04L 9/32* (2006.01)
*H04L 29/06* (2006.01)
*G07C 9/00* (2006.01)

(52) U.S. Cl.
CPC ...... *H04L 63/0876* (2013.01); *G07C 9/00166* (2013.01); *G07C 9/00571* (2013.01); *H04L 63/0428* (2013.01); *H04L 63/102* (2013.01)

(58) Field of Classification Search
USPC .............................................. 713/168; 726/4
See application file for complete search history.

(56) References Cited

U.S. PATENT DOCUMENTS 7,484,103 B2 * 1/2009 Woo ........................ G06F 21/10
380/201
8,438,246 B2 * 5/2013 Alnas .................. H04L 41/0273
709/203
(Continued)

FOREIGN PATENT DOCUMENTS

EP 2672464 A1 6/2012
WO 2011065892 A1 6/2011
(Continued)

OTHER PUBLICATIONS

European Search Report for Corresponding EP Application No. 14178592.3, dated Dec. 19, 2014.

*Primary Examiner* — Amare F Tabor
(74) *Attorney, Agent, or Firm* — Karl F. Milde, Jr.; Eckert Seamans Cherin & Mellott, LLC

(57) ABSTRACT

In a method for controlling a device requiring user-related permissions via a mobile terminal using a local data connection between the mobile terminal and the device to be controlled, the control commands requiring user-related permissions for the device to be controlled are generated by means of an interaction between the mobile device and an authentication server and/or a device management server and are transferred to the device to be controlled from the authentication and/or device management server via the mobile terminal. The control commands requiring user-related permissions for the device to be controlled are received by the mobile terminal and are thereafter transferred to the device to be controlled for the purpose of controlling the same and are not stored in the mobile terminal. The control commands received by the device to be controlled are not verified as to the permission of the user to utilize these control commands.

8 Claims, 3 Drawing Sheets

(56) References Cited

U.S. PATENT DOCUMENTS

| | | | | |
|---|---|---|---|---|
| 8,656,156 B2* | 2/2014 | Lee | G06F 21/10 | 455/411 |
| 8,791,790 B2* | 7/2014 | Robertson | G07C 9/00111 | 340/5.61 |
| 8,818,412 B2* | 8/2014 | Hotes | H04L 63/102 | 455/414.1 |
| 9,129,450 B2* | 9/2015 | Robertson | G07C 9/00111 | |
| 2005/0071682 A1* | 3/2005 | Kurokawa | H04L 63/08 | 726/4 |
| 2006/0147043 A1* | 7/2006 | Mann | H04L 41/0893 | 380/270 |
| 2007/0189532 A1* | 8/2007 | Onozu | G06Q 20/341 | 380/247 |
| 2010/0180038 A1* | 7/2010 | Horpestad | G06F 8/61 | 709/228 |
| 2010/0279673 A1* | 11/2010 | Sharp | H04L 67/125 | 455/419 |
| 2011/0246343 A1* | 10/2011 | Lee | G06Q 30/04 | 705/34 |
| 2011/0311052 A1* | 12/2011 | Myers | G07C 9/00103 | 380/270 |
| 2012/0185912 A1* | 7/2012 | Lee | H04L 63/10 | 726/1 |
| 2014/0049364 A1 | 2/2014 | Ahearn et al. | | |
| 2014/0123277 A1* | 5/2014 | Kawase | H04W 12/06 | 726/21 |
| 2014/0250500 A1* | 9/2014 | Lee | G06F 21/32 | 726/4 |

FOREIGN PATENT DOCUMENTS

| | | |
|---|---|---|
| WO | 2012151290 A1 | 12/2011 |
| WO | 2013181682 A1 | 12/2013 |

\* cited by examiner

METHOD FOR CONTROLLING A DEVICE REQUIRING USER-RELATED PERMISSIONS VIA A MOBILE TERMINAL

BACKGROUND OF THE INVENTION

The present invention relates to a method for controlling a device requiring user-related permissions via a mobile terminal, such as a smartphone or tablet.

Known from the prior art are devices, for example lock mechanisms, which can be controlled via a user's mobile terminal, such as a smartphone or tablet. Here, a local data connection to the device is established for the purpose of controlling the device, wherein the permission for controlling the device is acquired by means of an interaction between the mobile terminal and a server, typically via the Internet.

The WIPO publication WO2013/181682A1, for example, describes a method for controlling a lock mechanism by a user with a mobile terminal, wherein a local data connection to the lock mechanism is established by the mobile terminal for the purpose of controlling the lock mechanism and wherein an Internet connection to an identity provider is established for the purpose of issuing a key for opening the lock mechanism with the mobile terminal.

With this known method, the user authenticates himself to the identity provider via the mobile terminal. Authentication information is transmitted by the identity provider to the mobile terminal which is forwarded by the mobile terminal to an authorization entity in a network. After the authorization entity verifies the authentication information, a key is issued that is used to open the lock mechanism. A connection to an existing identity provider is established in order to receive the key for opening the lock mechanism. The key is then transferred from the mobile terminal to the lock mechanism via a local data connection between the mobile terminal and the lock mechanism.

With this known method, and with all methods for controlling a device requiring user-related permissions via a mobile terminal as are known in the prior art, the required permission for controlling the device is, or the control commands linked to required permissions are, stored in the mobile terminal and are transferred to the device to be controlled. However, this method may prove to be disadvantageous since, for one, the permissions or the commands linked to the permissions for controlling the device are linked to a particular mobile device and, for another, the local storage of the permissions, or of the commands linked to the permissions, in a mobile terminal presents a security risk if the mobile terminal is used by non-authorized persons for the purpose of controlling the device.

Linking the permission for controlling the device, or the commands linked to this permission to control a device, to a mobile terminal also presents a loss of convenience. For example, with this concept it is not possible to place a bicycle in a bicycle depot and to allow for the bicycle to be used by another person with another mobile terminal after opening the respective lock mechanism.

SUMMARY OF THE INVENTION

The objective of the present invention is, therefore, to provide a method for controlling a device requiring user-related permissions via a mobile terminal which, when implemented, avoids the known, stated disadvantages of the prior art. Furthermore, this method should be implementable not only if one, but also if several control commands are given.

This objective, as well as other objectives which will become apparent from the discussion that follows, are achieved, according to the present invention, by a method a method for controlling a device requiring user-related permissions via a mobile terminal using a local data connection between the mobile terminal and the device to be controlled, wherein the control commands requiring user-related permissions for the device to be controlled are generated by means of a preferably Internet-based interaction between the mobile device and an authentication and/or device management server, and are transferred to the device to be controlled from the authentication and/or device management server via the mobile terminal, so that the control commands requiring user-related permissions for the device to be controlled are not stored in the mobile terminal.

The control commands for the device to be controlled are received by the mobile terminal and are then transferred to the device for control purposes. After the transfer to the device, these commands are deleted if they are still present in the working memory of the device.

In an advantageous development of the invention, it is provided that the control commands transferred from the mobile terminal to the device to be controlled are not verified with regard to the permission of the user to utilize the control commands. The method is carried out quickly in this manner, and computing resources are used sparingly. After receiving the control command, and if applicable after decoding or verifying a signature of the same if the control command is encoded or signed, it is then carried out by the device to be controlled.

According to the invention, the local data connection between the mobile terminal and the device to be controlled is established preferably via a Bluetooth low energy (BLE) standard. The result is, for one, the advantage of low current consumption via a conventional battery, and for another, the ability to utilize the broadcasting properties of this standard by which the device to be controlled indicates to the mobile device that it can be controlled by the mobile terminal. Advantageously, the broadcasting signal contains a device ID (hardware ID) of the device to be controlled, which can uniquely identify the device. Alternatively, other standards for wireless or wired data communication known from the prior art can be used to establish a local data connection between the mobile terminal and the device to be controlled, wherein the device ID of the device to be controlled is actively requested by the mobile terminal if no broadcasting signal is available.

The device to be controlled may be, for example, a lock device for a door, a bicycle depot, a lock box, a cabinet, a ski lock or a locker, but also an access control device for people, for example for stadiums, etc. Furthermore it can also relate to machines for dispensing specified goods.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
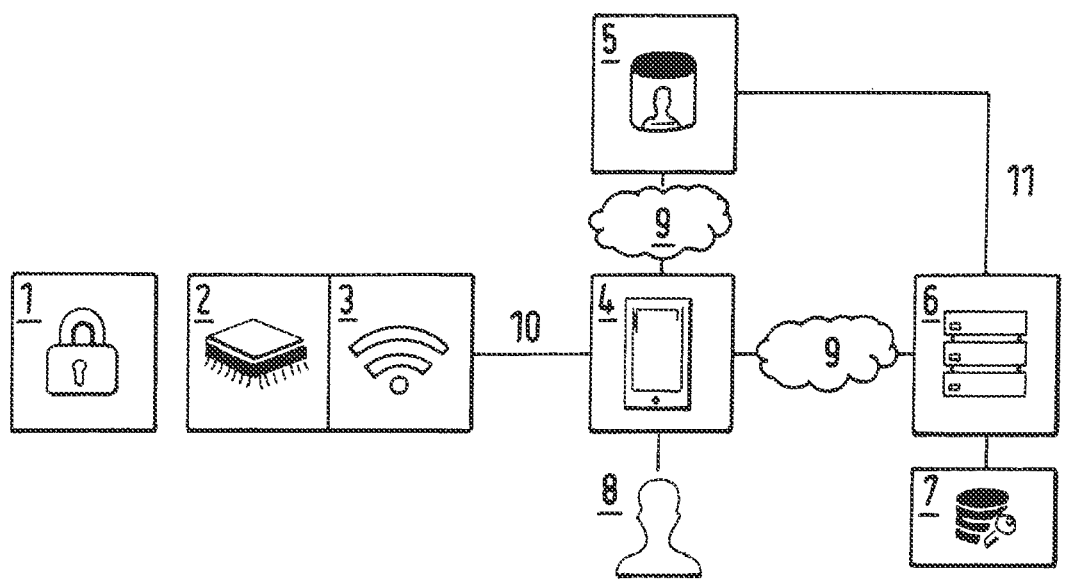
FIG. 1 a block diagram illustrating required components for implementing one variant of the method according to the present invention.

The preferred embodiments of the present invention will now be described with reference to FIGS. 1-3 of the drawings. Identical elements shown in FIGS. 1-3 are designated with the same reference numerals.

In FIG. 1, the device to be controlled is designated with 1, a micro-controller for processing the control commands is designated with 2 and a BLE module is designated with 3. The micro-controller 2 and the BLE module 3 are supplied with energy from a conventional standard battery. Furthermore, a proximity sensor can be provided, wherein the micro-controller 2 and the BLE module 3 transition from a standby mode to an active mode when the proximity sensor is triggered.

Figure 2:
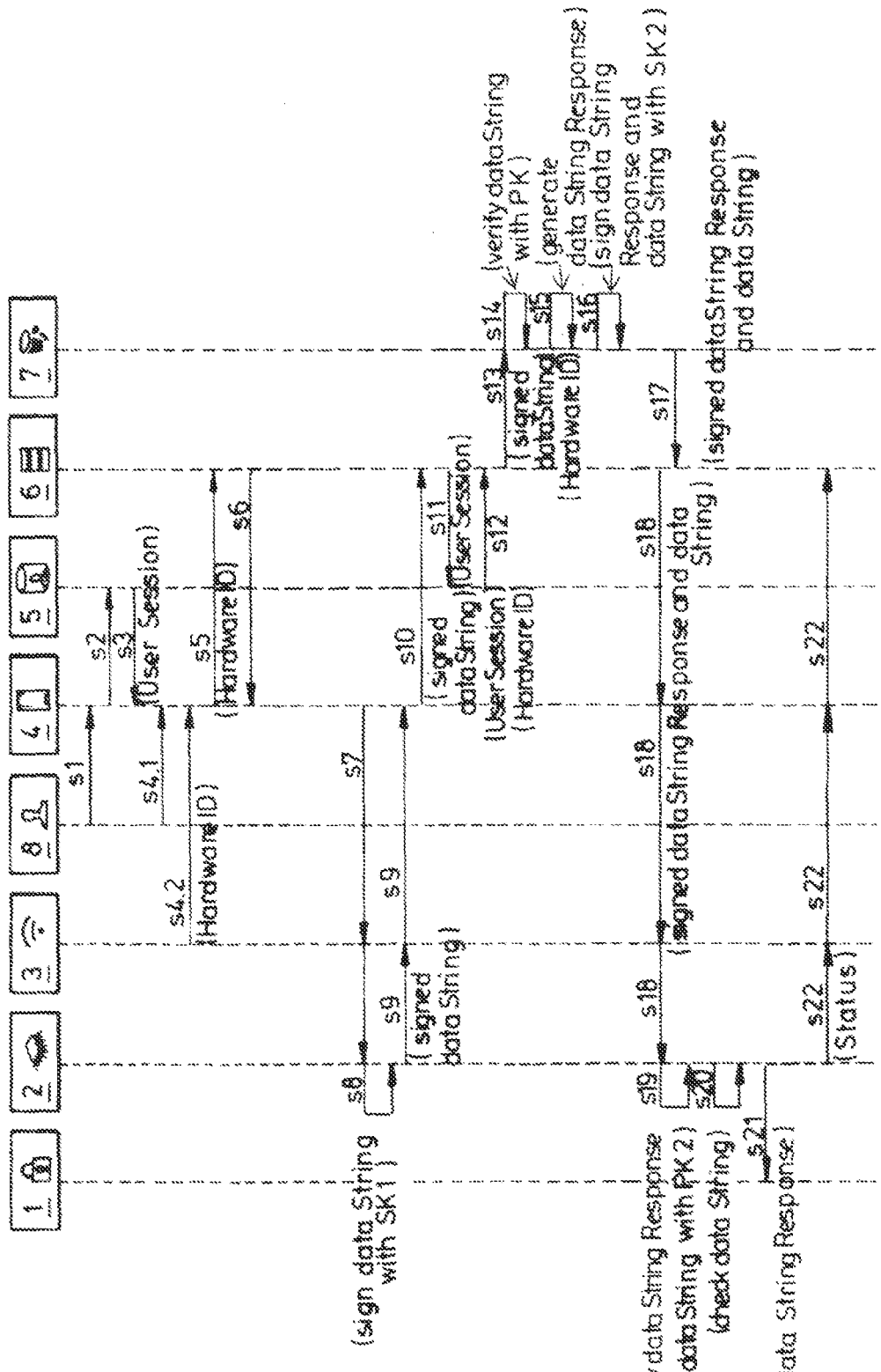
FIG. 2 a sequence diagram, illustrating the steps of the method for controlling a device in which a control command can be generated, using the example of opening a device designed as a lock mechanism, for a system of the type shown in FIG. 1.
Figure 3:
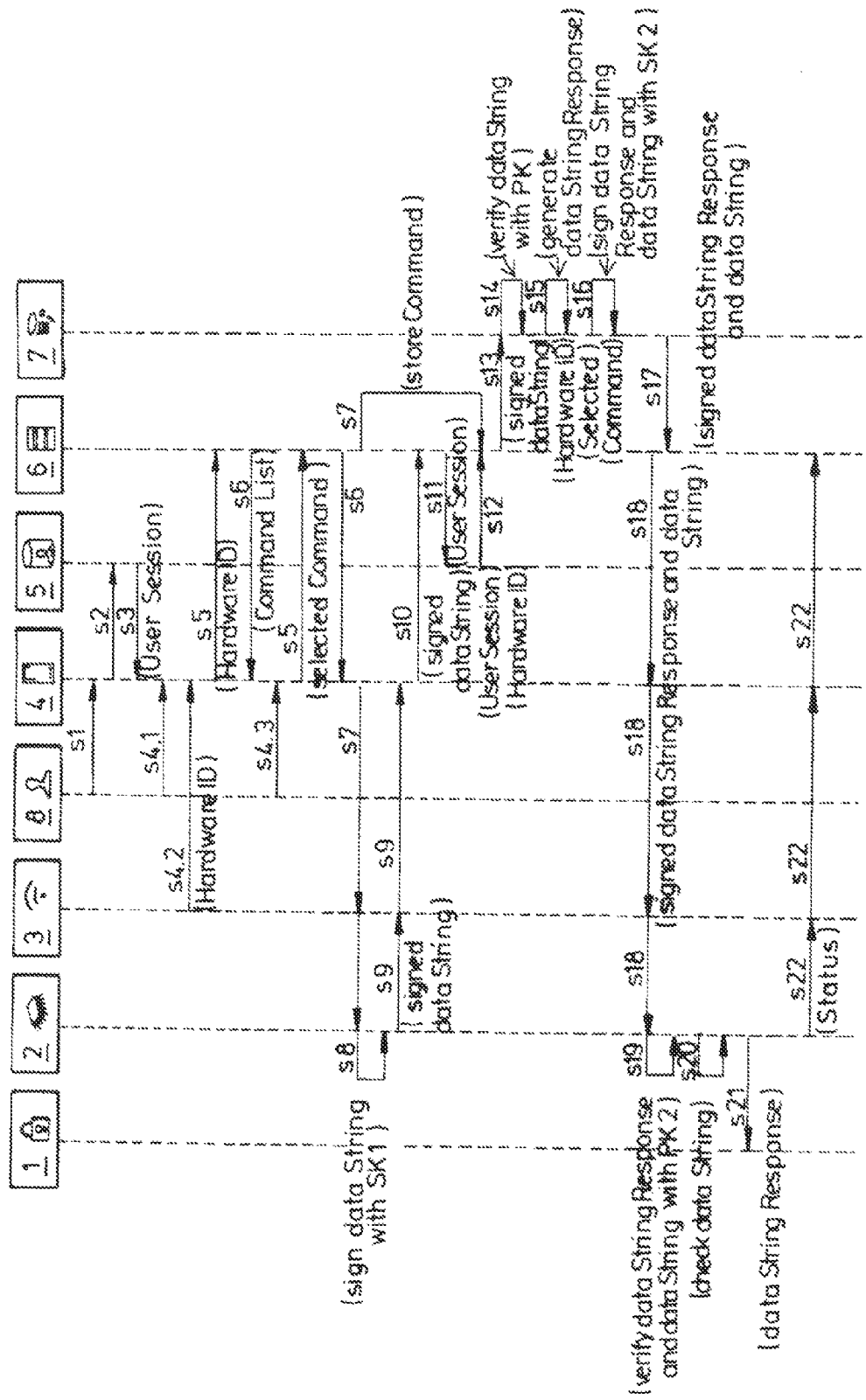
FIG. 3 a sequence diagram for illustrating the steps of the method for controlling a device, in which several control commands can be generated for a system of the type shown in FIG. 1.

In FIGS. 1 and 2 number 8 designates a user who operates a mobile terminal 4, which can be a smartphone, a tablet, etc., wherein a BLE communication path 10 can be established between the mobile terminal 4 and the micro-controller 2 for the purpose of controlling the device 1.

The mobile terminal 4 can communicate via an Internet connection 9 with an authentication server 5, where user data are stored and software for user authentication is implemented. No user permissions are stored in the authentication server 5. Furthermore, using an Internet connection 9, the mobile terminal 4 can communicate with a device management server 6 in which information regarding the devices to be controlled and associations between one or several users and a device to be controlled are stored.

An encryption module that receives, verifies and signs control commands is designated with 7. The encryption module can be integrated in the device management server 6. The authentication server 5 and the device management server 6 can be combined in one server. Furthermore, for the purpose of data communication, the authentication server 5 and the device management server 6 can be linked via a network connection that may be designed as a LAN connection 11. A B2C (Business to Consumer) or a B2B (Business to Business) billing model according to the prior art is provided depending on the transaction data between the user 8 and the device management server 6.

With reference to FIG. 2, user 8 starts the respective software, which can be implemented as a so-called app (step s1), on his mobile device 4, wherein login or registration of the user 8 is carried out in the next step s2 using a connection between the mobile terminal 4 and the authentication server 5, wherein a user session ID is transmitted from the authentication server 5 to the mobile terminal 4 (step s3) after login or registration has been carried out.

In the next step s4.1, user 8 selects via the mobile terminal 4 a device 1 to be controlled, wherein in the course of a BLE interaction between the mobile terminal 4 and the BLE module 3 of the device 1 to be controlled, a so-called broadcasting signal that contains the hardware ID of the device 1 to be controlled is transmitted from the BLE module 3 to the mobile terminal 4 (step s4.2).

In a next step s5, a connection is established between the mobile terminal 4 and the device management server 6, wherein the status of the device 1 to be controlled, which can be identified based on the hardware ID, is queried. In the course of a next step s6 of the method, if the device 1 to be controlled can be controlled, a signal is transmitted from the device management server 6 to the mobile terminal 4 indicating the controllability of the device 1 to be controlled via the mobile terminal 4. Since two control commands, namely "open" and "lock" are possible for the device 1 designed as a lock mechanism and since the device management server 6 knows the status of the device 1, only one command can be executed at any given moment, in the case at hand the command "open" for opening the lock mechanism.

Thereafter, a BLE data connection is established via the BLE module 3 and the micro-controller 2 (step s7) between the mobile terminal 4 and the device 1 to be controlled, wherein in a subsequent step s8 with the lock mechanism locked, the micro-controller 2 signs a data string with a public key SK1 of the device management server 6 and transmits is the same in a next step s9 to the mobile terminal 4.

The signed data string is transmitted to the device management server 6 together with the user session ID and the hardware ID of the device 1 to be controlled, wherein the one available control command, in the case at hand an open command, is requested for the lock mechanism 1 (s10).

In a next step s11, the device management server 6 verifies by means of an interaction with the authentication server 5 the user session ID received in step s10 and in case of a valid user session ID (s12) a data string response is requested by the encryption module 7 as a response to the contained data string (step s13). The encryption module 7 verifies the data string signed by the micro-controller 2 by means of a private key PK of the device management server 6 (step s14) and generates a data string response (step s15) that contains the control command, which together with the received data string is signed by the encryption module 7 with a public key SK2 of the micro-controller 2 (step s16). The data string response can be empty if only one control command is possible.

In a next step s17, the signed data string response together with the signed contained data string is transferred to the device management server 6, wherein thereafter in step s18 the signed data string response together with the signed contained data string is routed via the Internet, the mobile terminal 4 and the BLE data connection between the mobile terminal 4 and the micro-controller 2 without storage in the mobile terminal 4 to the micro-controller 2.

The contained data string is returned to the micro-controller 2 together with the data string response in order for the micro-controller 2 to verify that the received control command shall be carried out by the device 1. If the data string does not correspond to the originally generated data string that was transmitted to the device management server 6, the control command will not be carried out since it cannot be associated with the device 1. This is particularly advantageous if several devices are managed by the device management server 6, since this excludes the possibility that a device mistakenly carries out a control command that is intended for another device. The data string may be a unique, randomly generated number, for example.

In a next step s19, the received signed data string response and the returned data string are verified by the micro-controller 2 by means of a private key PK2 and after successful verification the micro-controller 2 (step s20) responds corresponding to the data string response and transits the respective command to the device 1 to be controlled. In a final step after the control command has been carried out, status information, which is required for carrying out the method again, is sent via the BLE data connection, the mobile terminal 4 and the Internet 9 to the device management server 6.

The method was described heretofore by means of only one possible control command, in the present example by using an unlock control command for opening a device 1 designed as a lock mechanism. A corresponding process is used in case of a lock control command.

Depending on the functionality and status of a device 1 to be controlled, further control commands can be generated, wherein according to the invention and referring to FIG. 3 for the case that a plurality of control commands are possible, after steps s1 to s5 of FIG. 2, the user 8 receives in step s6 from the device management server 6 a signal via the mobile terminal 4 indicating the controllability of the device 1 to be controlled via the mobile terminal 4 and in addition the possible control commands (i.e., a "command list").

Here, the user 8 selects via the mobile terminal 4 from the plurality of possible control commands the desired control command to be generated (additional step s4.3), wherein this information is sent in an additional step s5' from the mobile device 4 to the device management server 6, which confirms the selection in an additional step s6'. The selected control command for the device 1 is stored in the device management server 6 and is associated with the hardware ID of the device 1 (step s7').

The other steps of the method correspond to the steps of the method according to FIG. 2 with the distinction that, in step s13, the encryption module 7 requests a data string response that corresponds to or contains the selected control command. A device 1, for which multiple control commands can be generated, may be a vending machine for drinks offering a plurality of selection options, for example.

There has thus been shown and described a novel method for controlling a device via a mobile terminal which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for controlling a device requiring user-related permissions via a mobile terminal, said method utilizing a local data connection between a mobile terminal and a device to be controlled, wherein the control commands requiring user-related permissions for the device to be controlled are generated by means of an interaction via a connection between the mobile terminal and least one of (1) an authentication server and (2) device management server and are transferred to the device to be controlled from said at least one authentication server and device management server via the mobile terminal, said method comprising the steps of:

(a) receiving said control commands requiring user-related permissions for the device to be controlled at the mobile terminal, and (b) thereafter transferring said control commands the device to be controlled, for the purpose of controlling the same, without storing said control commands in the mobile terminal, wherein said control commands received by the device to be controlled are not verified as to the permission by the user to execute said control commands;

wherein the local data connection between the mobile terminal and the device to be controlled is established via a Bluetooth low energy ("BLE") standard; and wherein said method further comprises the following steps:

opening a software app by the user on the mobile terminal;

carrying out a registration or login of the user using a connection between the mobile terminal and the authentication server wherein, after carrying out the login or registration, a user session ID is transmitted from the authentication server to the mobile terminal;

selecting the device to be controlled by the user via the mobile terminal, wherein in the course of a BLE interaction between the mobile terminal and a BLE module of the device to be controlled, a signal containing the hardware ID of the device to be controlled is transmitted from the BLE module to the mobile terminal;

establishing a connection between the mobile terminal and the device management server, wherein the status of the device to be controlled, which is identified by means of a hardware ID, is requested, and transmitting a signal that indicates the controllability of the device to be controlled via the mobile device, from the device management server to the mobile terminal;

establishing a BLE data connection between the mobile terminal and the device to be controlled via the BLE module and a micro-controller of the device to be controlled, wherein, in a subsequent step, the micro-controller signs a data string with a public key of the device management server and transmits the signed data string to the mobile terminal;

transmitting the signed data string together with the user session ID and the hardware ID of the device to be controlled to the device management serve server, wherein the control command is requested;

verifying the user session ID of the device management server by means of an interaction with the authentication server and, if the user session ID is valid, requesting a data string response from an encryption module;

verifying, by the encryption module, the data string signed by the micro-controller by means of a private key of the device management server and generating a data string response containing the control command, which together with the received data string is signed by the encryption module using a public key of the micro-controller;

transferring the signed data string response together with the signed contained data string to the device management server, wherein thereafter the signed data string response together with the signed contained data string is routed via a connection between the mobile terminal and the device management server, the mobile terminal and the BLE data connection between the mobile terminal and the micro-controller without storage in the mobile terminal to the micro-controller;

verifying the received signed data string response and the returned data string from the micro-controller by means of a private key and, after the verification has been carried out, transmitting the control command for execution to the device to be controlled; and executing the control command and transmitting status information, via the BLE data connection between the mobile terminal and the device to be controlled via the BLE module, the mobile terminal and the connection between the mobile terminal and the device management server, to the device management server.

2. A method for controlling a device requiring user-related permissions via a mobile terminal, said method utilizing a local data connection between a mobile terminal and a device to be controlled, wherein control commands requiring user-related permissions for the device to be controlled are generated by means of an interaction via a connection between the mobile terminal and at least one of (1) an authentication server and (2) a device management server and are transferred to the device to be controlled from said at least one authentication server and device management server via the mobile terminal, said method comprising the steps of:

(a) receiving said control commands requiring user-related permissions for the device to be controlled at the mobile terminal, and (b) thereafter transferring said control commands to the device to be controlled, for the purpose of controlling the same, without storing said control commands in the mobile terminal, wherein said control commands received by the device to be controlled are not verified as to the permission by the user to execute said control commands;

wherein the local data connection between the mobile terminal and the device to be controlled is established via a Bluetooth low energy ("BLE") standard; and wherein said method further comprises the following steps:

opening a software app by the user on the mobile terminal;

carrying out a registration or login of the user using a connection between the mobile terminal and the authentication server, wherein after carrying out the login or registration, a user session ID is transmitted from the authentication server to the mobile terminal;

selecting the device to be controlled by the user via the mobile terminal, wherein in the course of a BLE interaction between the mobile terminal and a BLE module of the device to be controlled, a signal containing the hardware ID of the device to be controlled is transmitted from the BLE module to the mobile terminal;

establishing a connection between the mobile terminal and the device management server, wherein the status of the device to be controlled, which is identified by means of a hardware ID, is requested, and transmitting a signal that indicates the controllability of the device to be controlled via the mobile device and additionally displays the possible control commands ("command list"), from the device management server to the mobile terminal;

selecting, by the user, a desired control command to be generated from a command list of possible control commands via the mobile terminal, and transmitting the selected control command from the mobile terminal to the device management server, said device management server confirming the selection in a subsequent step;

storing the selected control command in the device management server and associating the selected control command with the hardware ID of the device;

establishing a BLE data connection between the mobile terminal and the device to be controlled via the BLE module and a micro-controller of the device to be controlled, and in a subsequent step, signing a data string with a public key of the device management server by means of the micro-controller and transmitting the data string to the mobile terminal;

transmitting the signed data string together with the user session ID and the hardware ID of the device to be controlled to the device management server, the device management server thereby requesting the control command;

verifying the user session ID of the device management server by means of an interaction with the authentication server and, if the user session ID is valid, requesting a data string response that contains or corresponds to the selected control command from an encryption module;

verifying, by the encryption module, the data string signed by the micro-controller by means of a private key of the device management server and generating a data string response containing the control command, which together with the received data string is signed by the encryption module using a public key of the micro-controller;

transferring the signed data string response together with the signed data string to the device management server, and thereafter routing to the micro-controller the signed data string response together with the signed data string via the connection between the mobile terminal and the device management server, and the mobile terminal and the BLE data connection between the mobile terminal and the micro-controller, without storage in the mobile terminal;

verifying the received signed data string response and the returned data string from the micro-controller by means of a private key and, after the verification has been carried out, transmitting the control command for execution to the device to be controlled; and executing the control command and transmitting status information, via the BLE data connection between the mobile terminal and the device to be controlled and the mobile terminal and a connection between the mobile terminal and the device management server, to the device management server.

3. The method defined in claim 1, wherein the connection between the mobile terminal and the device management server is an Internet-based connection.

4. The method defined in claim 2, wherein the connection between the mobile terminal and the device management server is an Internet-based connection.

5. The method defined in claim 1, wherein the device to be controlled is at least one of a lock device for an item selected from the group consisting of a door, a bicycle depot, a lock box, a cabinet, a ski lock and a locker, and an access control device for people and an access control device for a vending machine for a plurality of specific goods.

6. The method defined in claim 1, wherein the local data connection between the mobile terminal and the device to be controlled is established via a known standard for wireless or wired data communication and wherein, if no transmission signal is available, the hardware ID of the device to be controlled is actively requested by the mobile terminal.

7. The method defined in claim 2, wherein the device to be controlled is at least one of a lock device for an item selected from the group consisting of a door, a bicycle depot, a lock box, a cabinet, a ski lock and a locker, and an access control device for people and an access control device for a vending machine for a plurality of specific goods.

8. The method defined in claim 2, wherein the local data connection between the mobile terminal and the device to be controlled is established via a known standard for wireless or wired data communication and wherein, if no transmission signal is available, the hardware ID of the device to be controlled is actively requested by the mobile terminal.

* * * * *